(12) United States Patent
Sturkovich (10) Patent No.: US 9,876,626 B2
(45) Date of Patent: Jan. 23, 2018

(54) MICROWAVE BACKHAUL SYSTEM HAVING QUADRUPLE CAPACITY

(71) Applicant: Maxlinear Asia Singapore Private Limited, Singapore (SG)

(72) Inventor: Kobi Sturkovich, Netanya (IL)

(73) Assignee: Maxlinear Asia Singapore PTE LTD, Singapore (SG)

( * ) Notice: Subject to any disclaimer, the term of this patent is extended or adjusted under 35 U.S.C. 154(b) by 760 days.

(21) Appl. No.: 14/083,523

(22) Filed: Nov. 19, 2013

(65) Prior Publication Data

US 2015/0124660 A1 May 7, 2015

Related U.S. Application Data

(60) Provisional application No. 61/901,088, filed on Nov. 7, 2013.

(51) Int. Cl.
*H04L 5/04* (2006.01)
*H04B 7/10* (2017.01)
*H04L 25/03* (2006.01)

(52) U.S. Cl.
CPC .............. *H04L 5/04* (2013.01); *H04B 7/10* (2013.01); *H04L 2025/03426* (2013.01)

(58) Field of Classification Search
CPC . H04L 1/0003; H04L 1/0009; H04L 27/0014; H04L 2027/002; H04L 5/14; H04L 5/04; H04L 2025/03426; H04B 7/0413; H04B 7/08; H04B 7/10; H04B 7/12
See application file for complete search history.

(56) References Cited

U.S. PATENT DOCUMENTS

| 2011/0194656 | A1* | 8/2011 | Shaked | H04L 27/3863 375/346 |
| 2012/0093100 | A1* | 4/2012 | Qin | H04B 7/10 370/329 |
| 2013/0128936 | A1* | 5/2013 | Kennard | H04L 5/14 375/222 |
| 2013/0135986 | A1 | 5/2013 | Sturkovich et al. | |

* cited by examiner

*Primary Examiner* — Benjamin H Elliott, IV
*Assistant Examiner* — Prince A Mensah
(74) *Attorney, Agent, or Firm* — McAndrews, Held & Malloy, Ltd.

(57) ABSTRACT

A microwave backhaul system having quadruple capacity. In one embodiment, an outdoor communication unit in a microwave backhaul system is provided, which includes a first and second dual channel processing modules that are each configured to process two transmission/reception channels. The outdoor communication unit also includes two transmitter modules that are each configured to upconvert two channels for transmission at vertical polarization and a horizontal polarization.

10 Claims, 7 Drawing Sheets

MICROWAVE BACKHAUL SYSTEM HAVING QUADRUPLE CAPACITY

This application claims priority to provisional application No. 61/901,088, filed Nov. 7, 2013, which is incorporated herein by reference in its entirety.

BACKGROUND

Field of the Invention

The present invention relates generally to microwave backhaul architecture, and more specifically to a microwave backhaul system having quadruple capacity.

Introduction

Conventional microwave backhaul architectures are generally implemented as either a split outdoor unit (split ODU) configuration or an all outdoor unit (all ODU) configuration. Conventional split ODU configurations are generally comprised of both an indoor unit (IDU) and an outdoor unit (ODU), where the IDU and the ODU are connected over a single channel coaxial interconnect. The IDU in a conventional split ODU configuration typically includes a modem, a digital-to-analog converter and a baseband-to-intermediate frequency converter. Under normal operation, these conventional split ODU configurations generally involve transmitting an analog signal, at an intermediate frequency, over the single channel coaxial interconnect between the IDU and the ODU.

The typical single channel coaxial interconnect used to transmit the analog signal between the IDU and ODU has a number of limitations itself. For example, the coaxial interconnect can be relatively expensive to implement, can have a limited bandwidth, and can experience signal loses under certain conditions. Mobile backhaul providers are experiencing a growing demand for increased capacity as well as a shift from voice services to data services. These factors are driving mobile backhaul networks towards high capacity IP/Ethernet connections. Additionally, the transition to 4G and LTE networks is also driving the need for higher capacity, and moving more packet traffic onto mobile backhaul networks. As a result, the limitations of conventional single channel coaxial interconnects make it increasingly difficult to meet these increasing user demands.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In the present invention, it is recognized that the microwave backhaul world is growing due to increased bandwidth demands. It is a feature of the present invention that a quadrupling of capacity of a microwave backhaul system can be enabled without significant capital expenditure. A quadruple capacity system would enable the transmission and reception of four channels.

In one embodiment, an outdoor communication unit in a microwave backhaul system is provided, which includes a first input that is configured for connection to a first cable, a second input that is configured for connection to a second cable, a first dual channel processing module that is configured to process a first channel and a second channel carried over the first cable, a second dual channel processing module that is configured to process a third channel and a fourth channel carried over the second cable, a first transmitter module that is configured to receive first analog baseband signals from the first dual channel processing module, the first analog baseband signals including the first channel and the second channel, wherein the first transmitter module upconverts the first channel and the second channel for transmission at a first polarization, and a second transmitter module that is configured to receive second analog baseband signals from the second dual channel processing module, the second analog baseband signals including the third channel and the fourth channel, wherein the second transmitter module upconverts the third channel and the fourth channel for transmission at a second polarization different from the first polarization.

Figure 1:
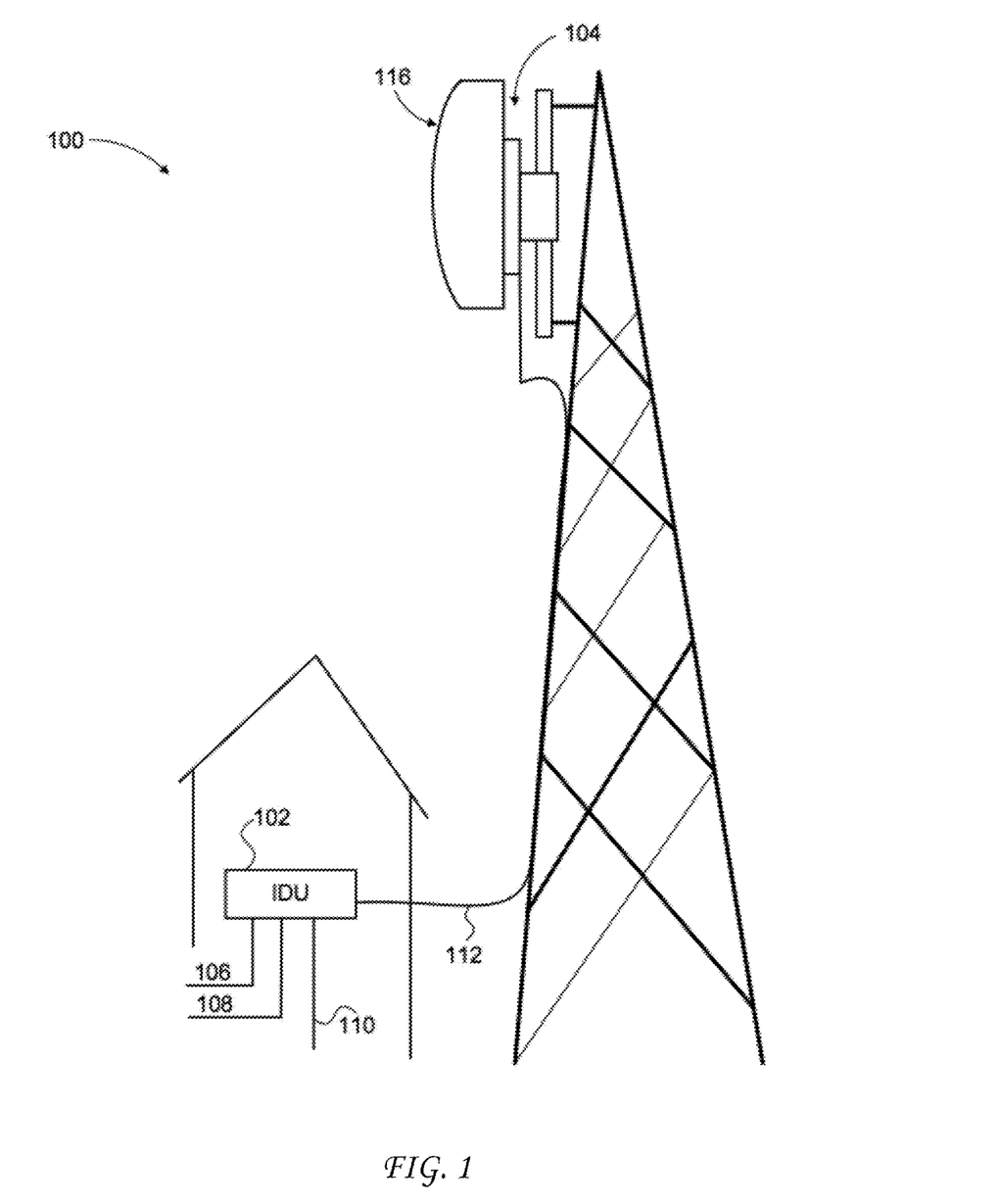
FIG. 1 illustrates a block diagram of a microwave backhaul system according to an exemplary embodiment of the present invention

FIG. 1 illustrates a block diagram of a microwave backhaul system 100 that includes IDU 102 and ODU 104 according to an exemplary embodiment of the present invention. Microwave, as used throughout this disclosure, refers to both terrestrial point-to-point (PtP) radio communications, as well as point-to-multipoint communications, and can include both wired and/or wireless communications.

Microwave backhaul system 100 initiates communication by accessing an information source, which can comprise, for example, audio data 106, video data 108, or any other data capable of being transmitted over an Internet Protocol (IP)/Ethernet connection 110. To facilitate this communication, IDU 102 can be coupled to a core network. In particular, IDU 102 can be configured to acquire one or more sequences of digital data (e.g., audio data 106, video data 108, data transmitted over IP/Ethernet connection 110, or the like) from the core network. IDU 102 can also be configured to support several additional services, such as Ethernet, time-division multiplexing (TDM), and control data that is aggregated over a radio link.

IDU 102 can be implemented at a location that is substantially removed from ODU 104, such as at a location at ground level. For example, IDU 102 can be positioned inside of a home or an office building, or the like. Conversely, ODU 104 can be implemented at a substantially elevated location, such as on top of a pole, on top of an antenna tower, on top of a building, or the like. In some embodiments, IDU 102 and ODU 104 can be separated by a significant distance (e.g., up to approximately 300 meters). In general, IDU 102 includes a modem assembly, while ODU 104 includes at least some RF functionalities as well as corresponding digital capabilities.

IDU 102 and ODU 104 are connected via communication pathway 112, which can be configured such that data can be transmitted between IDU 102 and ODU 104. In various examples, communication pathway 112 can comprise a twisted pair Ethernet cable, a fiber optic cable, a coaxial cable, an intermediate frequency (IF) cable, etc. Therefore, depending on a chosen communication medium, communication pathway 112 can facilitate transmission of an analog signal or a digital signal between IDU 102 and ODU 104. In some embodiments, communication pathway 112 can be a wireless communication channel.

Antenna 116 can be coupled to ODU 104, and can be positioned close to ODU 104. Therefore, microwave backhaul system 100 can be implemented such that data can be transmitted from IDU 102, across communication pathway 112, to ODU 104, and subsequently to antenna 116 where communication over a wireless link can then be initiated. Also, microwave backhaul system 100 can be implemented such that data received by antenna 116 can be transmitted from ODU 104 over communication pathway 112 to IDU 102.

As will be discussed in greater detail below, ODU 104 can be a "smart ODU." For example, ODU 104 can have digital capabilities, which can be implemented to improve the radio frequency (RF) functionalities within ODU 104. However, ODU 104 may not include all of the functionalities of a modem, which can instead be completely implemented within IDU 102 or split between the IDU 102 and ODU 104. Therefore, when ODU 104 is implemented as a "smart ODU," microwave backhaul system 100 can provide more efficient communication between IDU 102 and ODU 104. For example, ODU 104 can sample data received from IDU 102 and then correct the detected errors (e.g. by removing noise from data), which can be associated with either the IDU 102 or communication pathway 112. ODU 104 can then process data such that it can be properly transmitted over a wireless link via antenna 116. An example of a "smart ODU" is provided in non-provisional patent application Ser. No. 13/615,913, filed Sep. 14, 2012, which is incorporated herein by reference in its entirety.

As will also be discuss in greater detail below, communication pathway 112 can be a quadruple channel pathway. For example, communication pathway 112 can be implemented such that four transmission channels and four receipt channels can each coexist over communication pathway 112 at any given time. In one embodiment, the four transmission channels and the four receipt channels are facilitated by two coaxial cables, wherein each coaxial cable carries two transmission channels and two receipt channels. In another embodiment, the four transmission channels and the four receipt channels are facilitated by four coaxial cables. As would be appreciated, communication pathway 112 can be implemented in various ways to carry four transmission channels and four receipt channels.

Figure 2A:
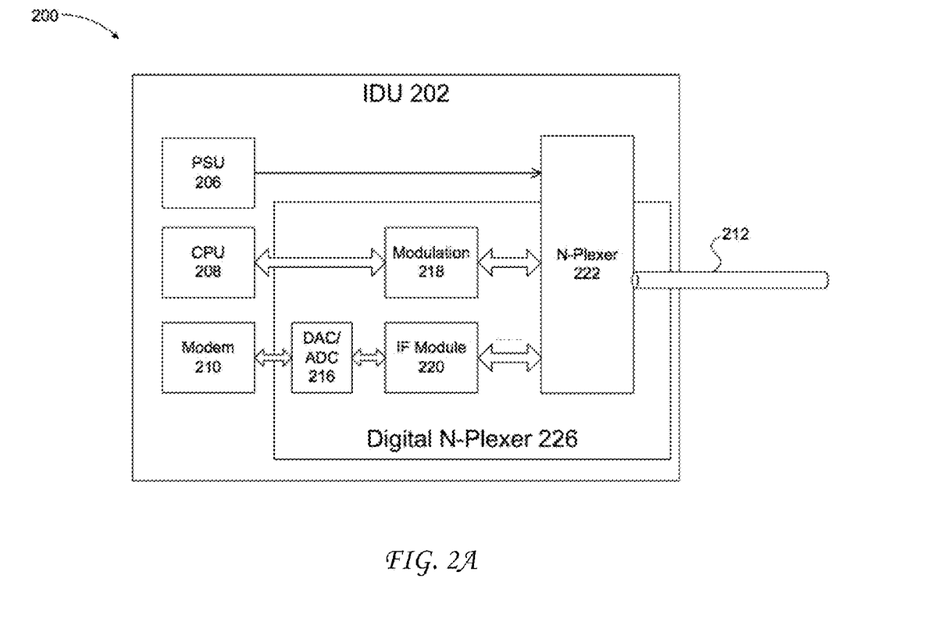
FIG. 2A illustrates a high-level block diagram of an IDU for implementation within a microwave backhaul system according to an exemplary embodiment of the present invention.
Figure 2B:
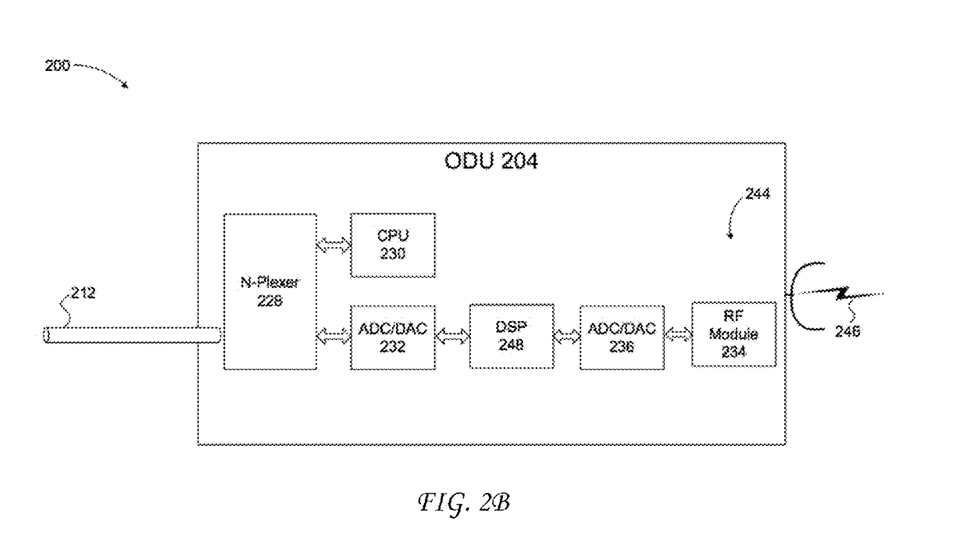
FIG. 2B illustrates a high-level block diagram of an ODU for implementation within a microwave backhaul system according to an exemplary embodiment of the present invention.

In one embodiment, ODU 104 can correct errors associated with a signal received over a wireless link via antenna 116. Microwave backhaul system 100 can also be configured to support adaptive coding and modulation (ACM), which provides high reliability of microwave backhaul system 100 even in extreme weather, such as wind, rain, hail, or the like. For example, ACM can adapt coding and modulation rates to changing environmental conditions to thereby increase throughput over a link and make efficient use of the existing spectrum. Thus, ACM enables the ODU to hitlessly manage the transitions when adjusting the number of transmission/ receipt channels based on the changes in the communication channel FIGS. 2A and 2B illustrate high-level block diagrams of an example IDU and ODU, respectively, for use within a microwave backhaul system according to an embodiment of the present invention. IDU 202 and ODU 204 are coupled together via communication pathway 212. IDU 202 can represent an exemplary embodiment of IDU 102 of FIG. 1, and ODU 204 can represent an exemplary embodiment of ODU 104 of FIG. 1.

IDU 202 includes a power supply unit (PSU) 206, a CPU 208, a modem assembly 210, a digital-to-analog converter/ analog-to-digital converter (DAC/ADC) block 216, a modulation block 218, and an intermediate frequency (IF) module 220. In some embodiments, IDU 202 can also include an N-Plexer 222. CPU 208 is configured to carry out instructions to perform arithmetical, logical, and/or input/output (I/O) operations of one or more of the aforementioned elements contained within IDU 202. In an embodiment, CPU 208 can control operation of modulation block 218 and N-Plexer 222.

Modem assembly 210 is configured to perform modulation and demodulation of data that is to be transmitted between IDU 202 and ODU 204. In some embodiments, modem assembly 210 can function substantially similar to a baseband modem. Further, modem assembly 210 can be configured to cancel out noise associated with IDU 202 or communication pathway 212. DAC/ADC block 216 can be configured to transmit and/or receive data from modem assembly 210. DAC/ADC block 216 is also configured to perform digital-to-analog and/or analog-to-digital conversions of data such that the data is suitable for transmission over communication pathway 212.

Modulation block 218 can also be configured to perform various modulation and/or demodulation techniques. In an embodiment, modulation block 218 can be configured to perform amplitude-shift keying. For example, modulation block 218 can be configured to perform amplitude-shift keying by utilizing a finite number of amplitudes, where each amplitude is assigned a unique pattern of binary digits. Each pattern can then be configured to form the specific symbol that is represented by the particular amplitude. Additionally, when modulation block 218 is configured to perform demodulation, modulation block 218 determines the amplitude of the received signal and maps it back to the symbol it represents, thus recovering the original data.

IF module 220 can be configured to transmit and/or receive data from DAC/ADC block 216. IF module 220 is also configured to perform a frequency conversion of the received data such that data is suitable for transmission over communication pathway 212. For example, IF module 220 can be configured to convert data from a baseband frequency to an IF.

N-Plexer 222 can be configured to permit N-directional communication over communication pathway 212. In particular, N-Plexer 222 is configured to isolate IDU 202 from ODU 204, while permitting them to share a common antenna. N-Plexer 222 is also configured to receive a control signal (e.g. a Telemetry ASK signal) output from modulation block 218, and to receive an IF signal output from IF module 220. Additionally, N-Plexer 222 can be configured to convert and/or combine each of these inputs to form data. N-Plexer 222 is also configured to transmit and/or receive data, over communication pathway 212, between IDU 202 and ODU 204. In an embodiment, N-Plexer 222 can function substantially as an analog duplexer (multiplexer/demultiplexer). In one embodiment, communication pathway 212 can be embodied as one or more IF cables that can facilitate quadruple channel communication with one or more IDUs.

In an exemplary embodiment, DAC/ADC block 216, modulation block 218, IF module 220 and N-Plexer 222 can be replaced by Digital N-Plexer 226. In particular, Digital N-Plexer 226 can be configured to multiplex/demultiplex the required signal in the digital domain, rather than in the analog domain. Subsequently, Digital N-Plexer 226 can allow communication pathway 212 to be implemented as either a digital pathway or an analog pathway. Using Digital N-Plexer 226 allows for a simpler implementation of IDU 202. For example, when implementing IDU 202 having Digital N-Plexer 226, no analog functionality would be required, and instead only a single digital chip substrate would be needed. As a result, the cost of implementing IDU 202 can be decreased. Additionally, using a Digital N-Plexer 226 can provide an improved yield, shorter production testing, lower assembly cost, lower peripheral component count, and can support greater distances between IDU 202 and ODU 204, to provide some examples.

As illustrated in FIG. 2B, ODU 204 can also include an N-Plexer 228, which can be implemented in several different manners. For example, N-Plexer 228 can be an analog N-Plexer, a digital N-Plexer, or a split function N-Plexer (e.g., where N-Plexer 228 is partially analog and partially digital). When N-Plexer 228 represents a digital N-Plexer, N-Plexer 228 can function in a substantially similar manner as Digital N-Plexer 226. In particular, N-Plexer 228 can be configured to multiplex/demultiplex signals in the digital domain. N-Plexer 228 also allows for a simpler implementation of ODU 204 because no analog functionality would be required, and instead only a single digital chip substrate would need to be implemented within ODU 204. Therefore, the cost of implementing ODU 204 can also be decreased. Similar to Digital N-Plexer 226, implementing N-Plexer 228 within ODU 204 can provide an improved yield, shorter production testing, lower assembly cost, lower peripheral component count, and can support greater distances between IDU 202 and ODU 204, to provide some examples.

In an embodiment, IDU 202 and ODU 204 can be configured to perform an N-Plexer elimination technique. In particular, the functionality directed towards filtering RX, after being received over communication pathway 212, and TX, before being transmitted over communication pathway 212, can be removed from N-Plexers 226 and 228. Instead, this functionality can be implemented within the digital chip substrate (e.g. integrated circuit) that comprises IDU 202 and the digital chip substrate (e.g. integrated circuit) that comprises ODU 204. IDU 202 and ODU 204 can then filter the required signals through any combination of an analog filtering process, a signal sampling process and/or a digital filtering process.

ODU 204 can also include CPU 230, ADC/DAC blocks 232 and 236, digital signal processor (DSP) 248, and RF module 234. CPU 230 can be configured to function in a substantially similar manner as CPU 208. In particular, CPU 230 can be configured to carry out instructions to perform arithmetical, logical, and/or I/O operations of one or more of the elements contained within ODU 204. In an embodiment, CPU 208 can control operation of N-Plexer 228. ADC/DAC block 232 can be configured to transmit and/or receive data from N-Plexer 228. ADC/DAC blocks 232 and 236 are also configured to perform analog-to-digital and/or digital-to-analog conversions of data such that data can be properly transmitted and/or received over communication pathway 212. Further, DSP 248 can be configured to perform mathematical manipulation techniques on data, such that data may be modified or improved according to a desired processing method. For example, DSP 248 can be configured to measure, filter, or compress data prior to being output to ADC/DAC block 236, such that error detection and/or error correction can be performed on the data. In an embodiment, after the data is received, over communication pathway 212, at ODU 204, the data traverses through N-Plexer 228, to ADC/DAC block 232, to DSP 248, to ADC/DAC block 236, to RF module 234 and to antenna 244 before being transmitted across wireless link 246. Similarly, after data is received over wireless link 246, at ODU 204, data traverses from antenna 244 to RF module 234, to ADC/DAC block 236, to DSP 248, to ADC/DAC block 232, and to N-Plexer 228 before being transmitted over communication pathway 212.

RF module 234 can be configured to transmit and/or receive data from ADC/DAC block 236. RF module 234 can also be configured to perform a frequency conversion of data such that data can be properly received over communication pathway 212. For example, when data is received at RF module 234, data can have a frequency residing in the IF range. Therefore, RF module 234 can up-convert data from an IF to a RF such that data can then be transmitted over wireless link 246. RF module 234 can also be configured to down-convert a signal received over the wireless link from a RF to an IF such that the received signal can be transmitted over communication pathway 212 to IDU 202.

Figure 3:
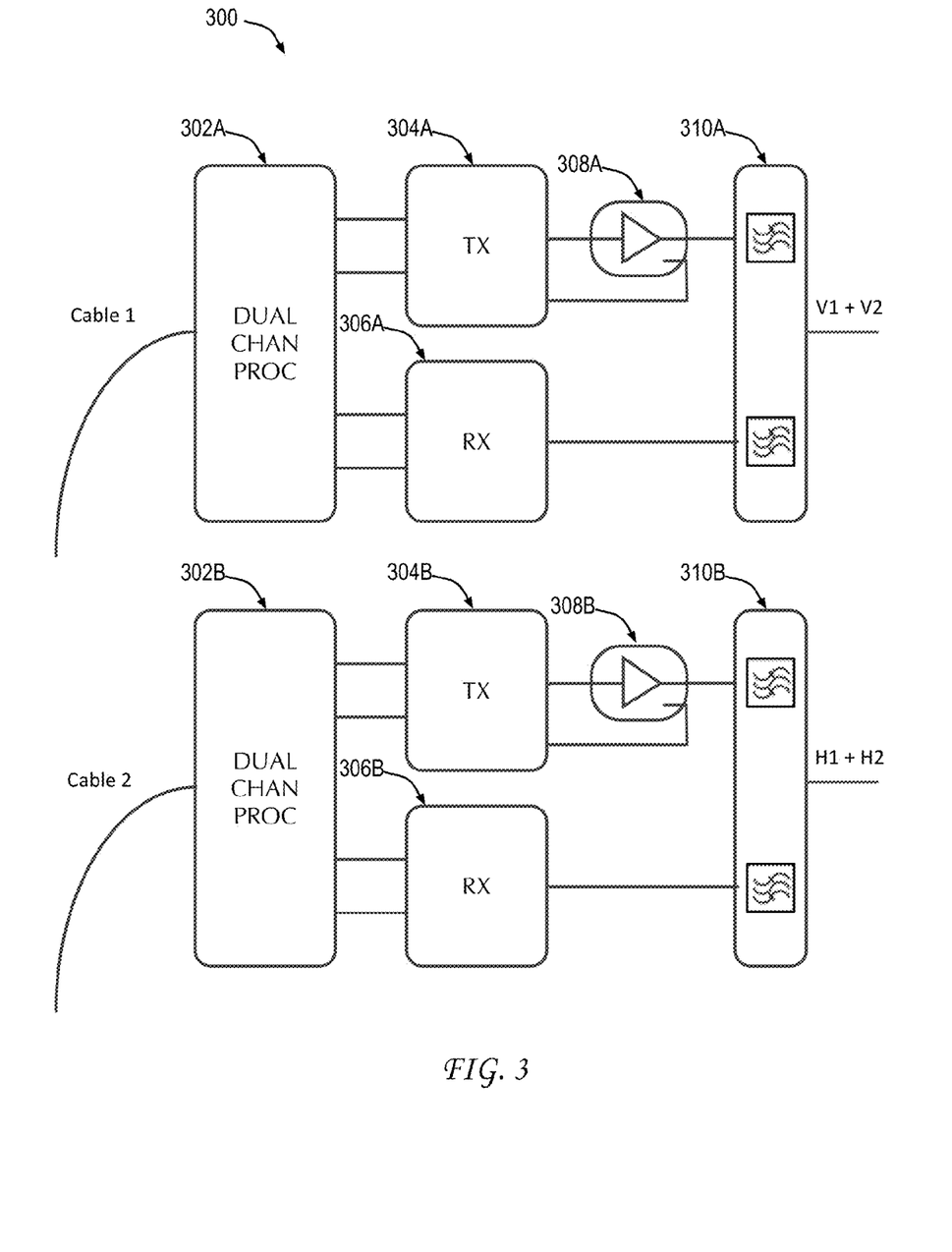
FIG. 3 illustrates a high-level block diagram of an ODU for implementation within a quadruple capacity microwave backhaul system according to an exemplary embodiment of the present invention.

FIG. 3 illustrates a high-level block diagram of an ODU for implementation within a quadruple capacity microwave backhaul system according to an exemplary embodiment of the present invention. ODU 300 can represent an exemplary embodiment of ODU 204. ODU 300 can also represent a "smart ODU." ODU 300 includes dual channel processing blocks 302A, 302B, transmission blocks 304A, 304B, reception blocks 306A, 306B, and diplexers 310A, 310B.

In one embodiment, dual channel processing blocks 302A, 302B can be configured to interface with cable 1 and cable 2, respectively. Each of cable 1 and cable 2 can be configured to carry two channels between ODU 300 and an IDU. As will be described in greater details below, dual channel processing block 302A, in combination with transmission block 304A and reception block 306A, can be configured to enable two transmission channels and two reception channels on a vertical polarization, while dual channel processing block 302B, in combination with transmission block 304B and reception block 306B, can be configured to enable two transmission channels and two reception channels on a horizontal polarization. In combination, ODU 300 enables a quadruple capacity microwave backhaul system.

Figure 4:
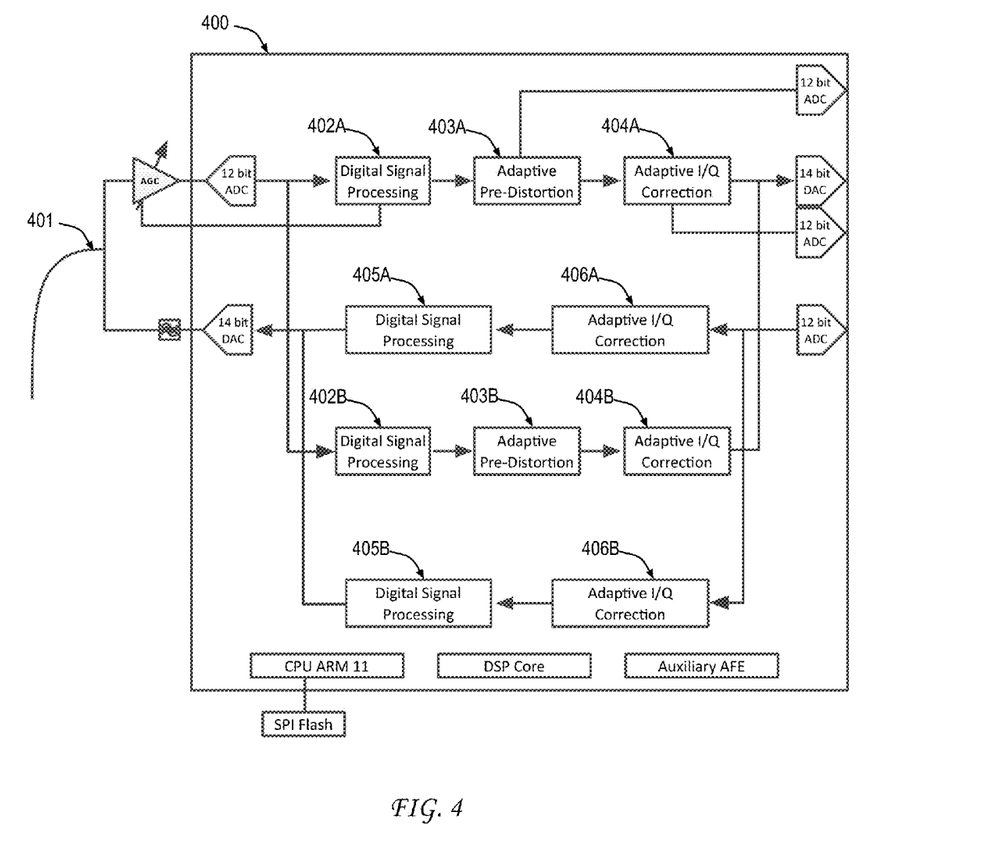
FIG. 4 illustrates a block diagram of a dual-channel processing module included within an ODU according to exemplary embodiments of the present invention.

FIG. 4 illustrates a block diagram of a dual-channel processing module included within an ODU according to an exemplary embodiment of the present invention. Dual-channel processing module 400 can represent an exemplary embodiment of dual-channel processing module 302A, 302B. As illustrated, dual-channel processing module 400 can interface with a single cable 401 which carries two transmission channels and two reception channels. On the transmit path, a transmit signal received from cable 401 is provided to IF automatic gain control (AGC) which operates under the control of a digital signal processor (DSP). In one embodiment, the interface of dual-channel processing module 400 with cable 401 is facilitated by a wide band analog front end that includes wide band capture ADC/DAC.

As illustrated, the two transmission channels can be processed separately, wherein a first transmission channel is processed by digital signal processing 402A and a second transmission channel is processed by digital signal processing 402B. In general, digital signal processing 402A, 402B can be configured to perform various functions such as AGC, digital tuned filtering, down-conversion to baseband, equalization, etc. For each of the two transmission channels, further processing is performed by adaptive pre-distortion modules 403A, 403B, and adaptive I/Q correction modules 404A, 404B. As will be described in greater detail below, adaptive pre-distortion modules 403A, 403B as well as adaptive I/Q correction modules 404A, 404B perform their respective functions using feedback received from a transmission module. For simplicity, the feedback to adaptive pre-distortion module 403B as well as adaptive I/Q correction modules 404B is not shown. After the adaptive pre-distortion and adaptive I/Q correction functions have been performed, the analog baseband signals representative of the two separate channels are subsequently passed onto a transmission module. On the receive path, the two reception channels are received from a receiver module and separately processed by adaptive I/Q correction modules 406A, 406B and digital signal processing 405A, 405B prior to transmission over cable 401.

As noted above, the communication pathway between the IDU and ODU can be implemented in a variety of ways. In one embodiment, the communication pathway between an IDU and a dual-channel processing module can be enabled by two cables where each cable carries separate transmission/reception channels.

Figure 5:
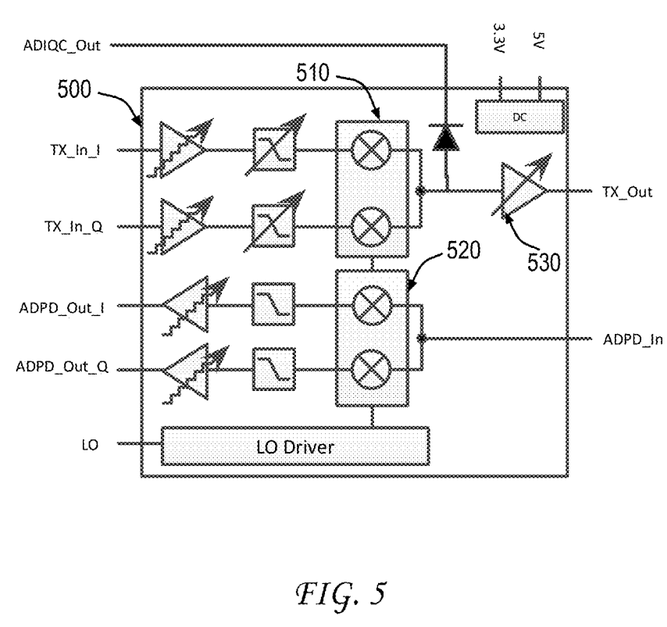
FIG. 5 illustrates a block diagram of a transmitter module included within an ODU according to an exemplary embodiment of the present invention.

FIG. 5 illustrates a block diagram of a transmitter module included within an ODU according to an exemplary embodiment of the present invention. Transmitter module 500 can represent an exemplary embodiment of transmitter block 304A, 304B. As illustrated, transmitter module 500 receives analog baseband In-phase (I) and Quadrature (Q) signals TX_In_I and TX_In_Q, respectively, from a dual-channel processing module. As noted above, the digital baseband signals have undergone adaptive pre-distortion and adaptive I/Q correction based on feedback from the transmitter module. After the analog baseband signals TX_In_I and TX_In_Q have undergone ADC and filtering of the I and Q signals, the respective I and Q signals are used by upconversion module 510 to convert the signals to the RF domain (e.g., 5.92 GHz to approximately 43.5 GHz) using a local oscillator (LO). Power amplifier (PA) 530 is configured to receive the upconverted signal from upconversion module 510 and to perform automatic transmit power control.

Figure 7:
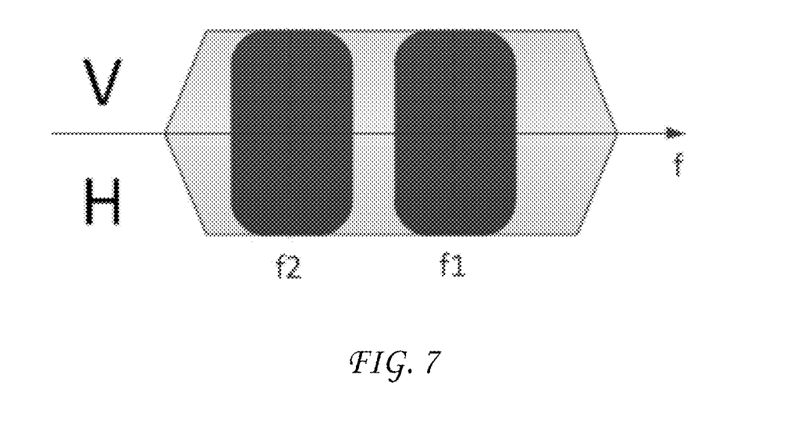
FIG. 7 illustrates an example spectral diagram according to an embodiment of the present invention.

As illustrated in FIG. 3, the output of transmission block 304A, 304B is then amplified by off-chip PA 308A, 308B to produce two channels on a vertical polarization and two channels on a horizontal polarization. In one embodiment, the two channels in the vertical polarization and the two channels in the horizontal polarization have a frequency separation (e.g., 500 MHz). FIG. 7 illustrates an example spectral diagram according to an embodiment of the present invention that includes the two channels in the vertical polarization and the two channels in the horizontal polarization.

In general, PA 308A, 308B can be configured to amplify data, after the data has been up-converted by the frequency converters in transmission module 304A, 304B. In particular, PA 308A, 308B can be configured to amplify data such that it is capable of being transmitted over the wireless link. The amplified signal can also be fed back to the transmission block 304A, 304B.

Returning to FIG. 5, the amplified signal can be received by transmission module 500 as signal ADPD_IN. This signal can be used by conversion module 520 to convert a signal from RF to baseband, thereby generating feedback signals (ADPD_Out_I and ADPD_Out_Q) that are received for use by adaptive pre-distortion modules in the dual-channel processing modules. As is further illustrated in FIG. 5, the signal generated by upconversion module 510 is also fed back (ADIQC_Out) to the dual-channel processing module for use by the adaptive I/Q correction modules.

Figure 6:
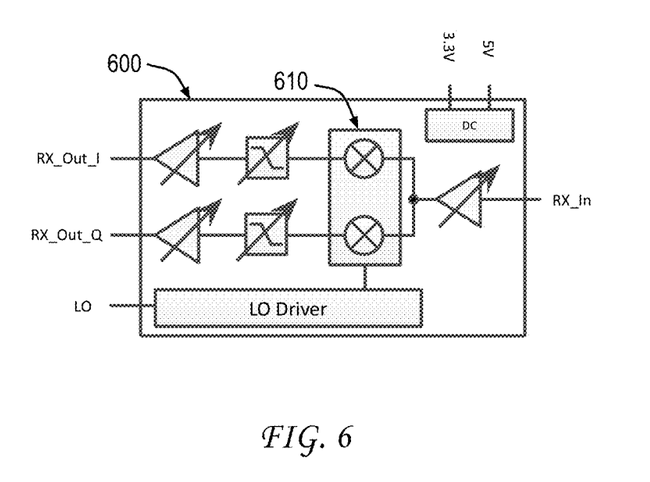
FIG. 6 illustrates a block diagram of a receiver module included within an ODU according to an exemplary embodiment of the present invention.

FIG. 6 illustrates a block diagram of a reception module included within an ODU according to an exemplary embodiment of the present invention. Reception module 600 can represent an exemplary embodiment of reception block 306A, 306B. As illustrated, reception module 600 includes conversion module 610, which can function substantially similar to conversion module 520 in converting a signal from RF to baseband. Reception module 600 can also be configured to transmit analog baseband I and Q signals (RX_Out_I and RX_Out_Q) to dual-channel processing module 302A, 302B.

It should be noted that transmission module 500 and reception module 600 can also include a controller that can be configured to transmit and/or receive control and telemetry signals between itself and dual-channel processing modules. In that regard, transmission module 500 and reception module 600 can include a phase hits canceller that can be configured to sample signals, look for frequency jumps, and record any such frequency jumps in the digital domain. The phase hits canceller can be configured to correct phase hits and microphonics hits, which can be caused by physical phenomenon interacting with the ODU such as wind, rain, hail, or the like.

In various embodiments, the principles of the present invention can be implemented in split ODU configurations, all ODU configurations, or the split microwave backhaul architectures disclosed herein. Where the principles of the present invention are implemented within an all ODU configuration, a modem can be used to drive two channels through a single DAC/ADC, a single transmitter, and a single receiver. In embodiments where the principles of the present invention are implemented within split microwave backhaul architectures, the ODU can be configured to transmit/receive four channels from various configurations and to flexibly configure the channels such that they can traverse through an air interface.

Although the description of the present invention is to be described in terms of microwave backhaul architecture, those skilled in the relevant art(s) will recognize that the present invention can be applicable to other architectures without departing from the spirit and scope of the present invention.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An outdoor communication unit in a microwave backhaul system, comprising: a first input that is configured for connection to a first cable;
   a second input that is configured for connection to a second cable;
   a first dual channel processing module that is configured to process a first channel and a second channel carried over the first cable;
   a second dual channel processing module that is configured to process a third channel and a fourth channel carried over the second cable;
   a first transmitter module that is configured to receive first analog baseband signals from the first dual channel processing module, the first analog baseband signals including the first channel and the second channel, wherein the first transmitter module upconverts the first channel and the second channel for transmission at a first polarization; and
   a second transmitter module that is configured to receive second analog baseband signals from the second dual channel processing module, the second analog baseband signals including the third channel and the fourth channel, wherein the second transmitter module upconverts the third channel and the fourth channel for transmission at a second polarization different from the first polarization.

2. The outdoor communication unit of claim 1, wherein the first dual channel processing module and the second dual channel processing module are implemented on separate digital chip substrate.

3. The outdoor communication unit of claim 1, wherein the first transmitter module and the second transmitter module are implemented on separate digital chip substrate.

4. The outdoor communication unit of claim 1, further comprising:
   a first receiver module that is configured to receive third signals, the third signals including a fifth channel and a sixth channel that were received at the first polarization; and
   a second receiver module that is configured to receive fourth signals, the fourth signals including a seventh channel and an eight channel that were received at the second polarization.

5. The outdoor communication unit of claim 1, wherein the first dual channel processing module performs adaptive pre-distortion based on first feedback from the first transmitter module and performs adaptive I/Q correction based on second feedback from the first transmitter module.

6. An outdoor communication unit in a microwave backhaul system, comprising:
   a first dual channel processing module that is configured to process a first channel and a second channel;
   a second dual channel processing module that is configured to process a third channel and a fourth channel;
   a first transmitter module that is configured to receive first analog baseband signals from the first dual channel processing module, the first analog baseband signals including the
   first channel and the second channel, wherein the first transmitter module upconverts the first channel and the second channel for transmission at a first polarization; and
   a second transmitter module that is configured to receive second analog baseband signals from the second dual channel processing module, the second analog baseband signals including the third channel and the fourth channel, wherein the second transmitter module upconverts the third channel and the fourth channel for transmission at a second polarization different from the first polarization.

7. The outdoor communication unit of claim 6, wherein the first dual channel processing module and the second dual channel processing module are implemented on separate digital chip substrate.

8. The outdoor communication unit of claim 6, wherein the first transmitter module and the second transmitter module are implemented on separate digital chip substrate.

9. The outdoor communication unit of claim 6, further comprising:
   a first receiver module that is configured to receive third signals, the third signals including a fifth channel and a sixth channel that were received at the first polarization; and
   a second receiver module that is configured to receive fourth signals, the fourth signals including a seventh channel and an eight channel that were received at the second polarization.

10. The outdoor communication unit of claim 6, wherein the first dual channel processing module performs adaptive pre-distortion based on first feedback from the first transmitter module and performs adaptive I/Q correction based on second feedback from the first transmitter module.

* * * * *